Oct. 14, 1924.
G. T. INGERSOLL
1,511,476
ATTACHMENT FOR TRACTORS
Filed July 26, 1922    3 Sheets-Sheet 1
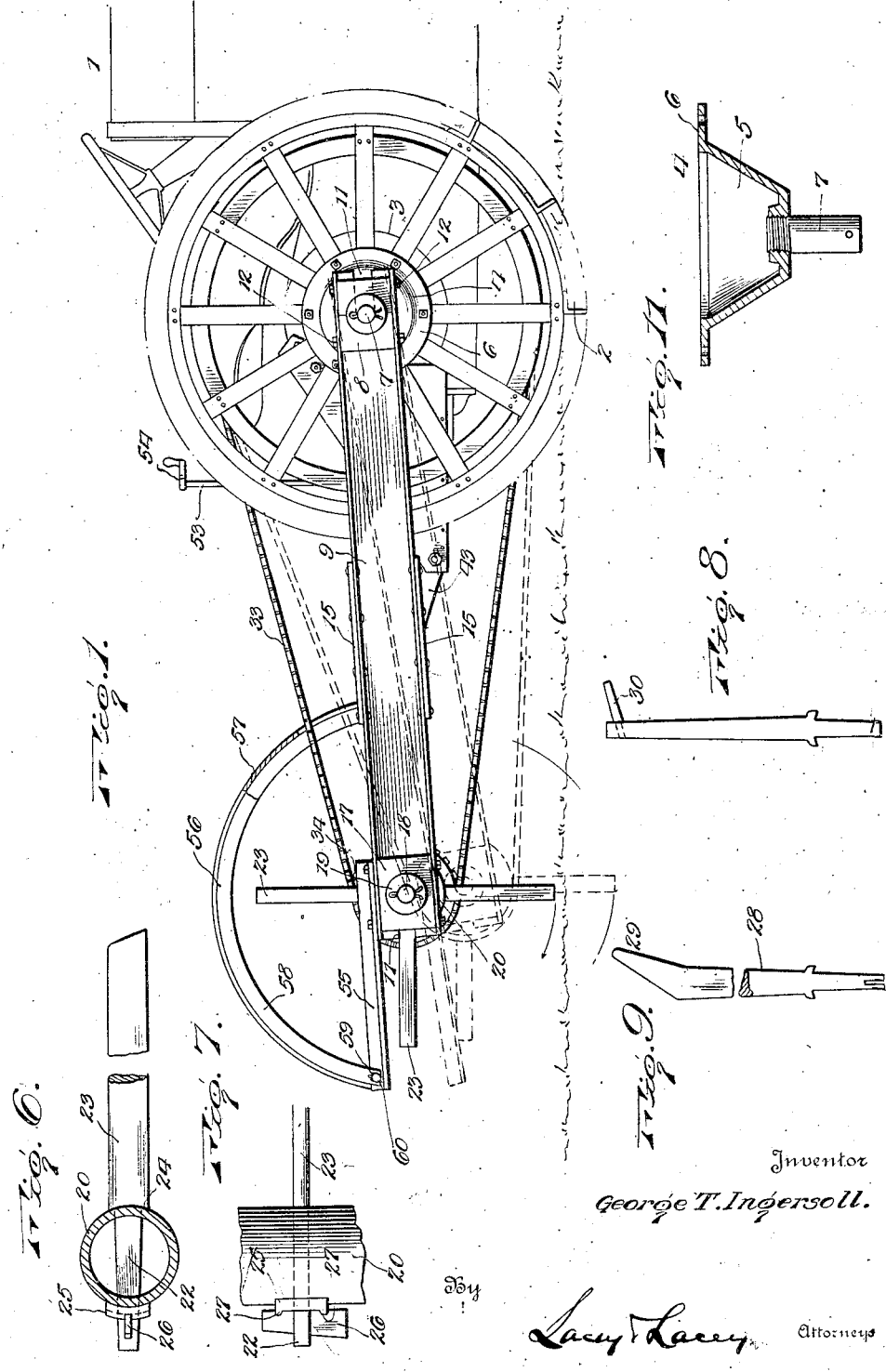
Inventor
George T. Ingersoll.
By
Lacey & Lacey, Attorneys Oct. 14, 1924.   1,511,476
G. T. INGERSOLL
ATTACHMENT FOR TRACTORS
Filed July 26, 1922   3 Sheets-Sheet 2
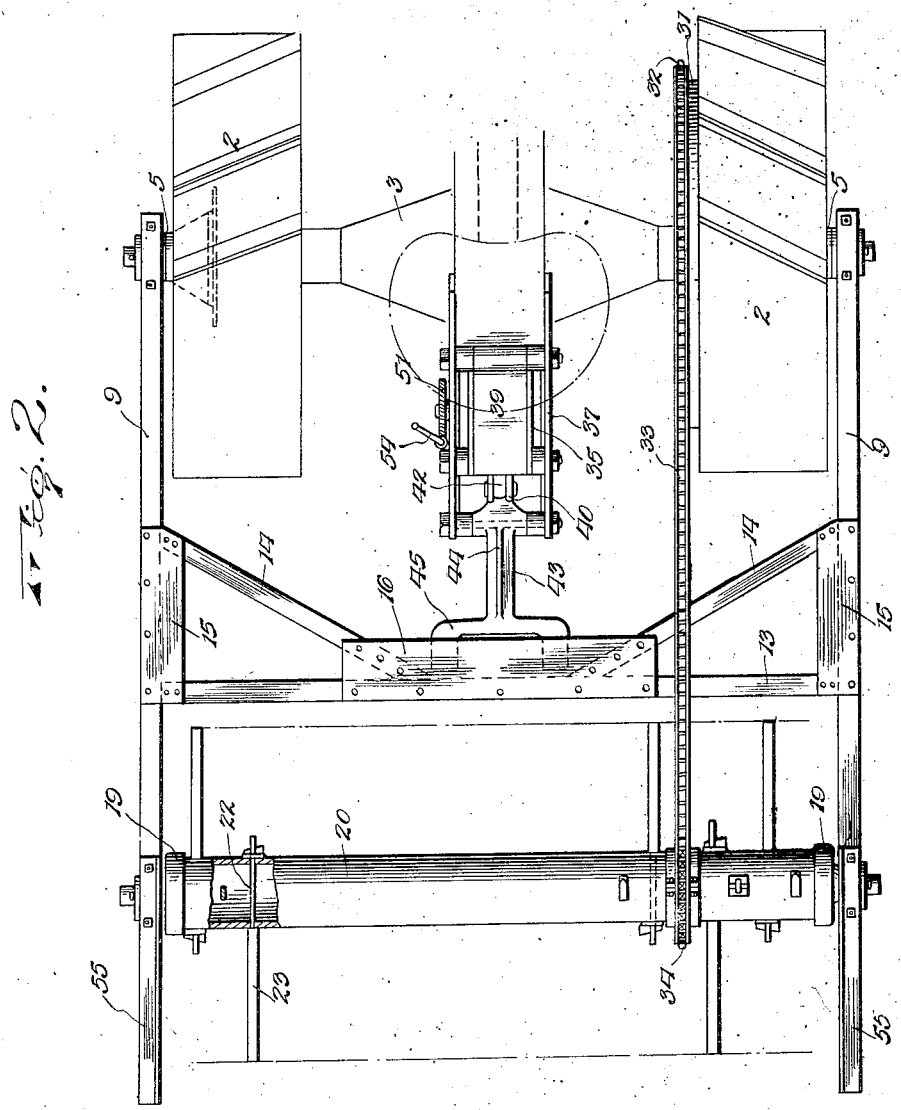
Inventor
George T. Ingersoll.
By Lacey & Lacey, Attorneys Oct. 14, 1924.
G. T. INGERSOLL
1,511,476
ATTACHMENT FOR TRACTORS
Filed July 26, 1922    3 Sheets-Sheet 3
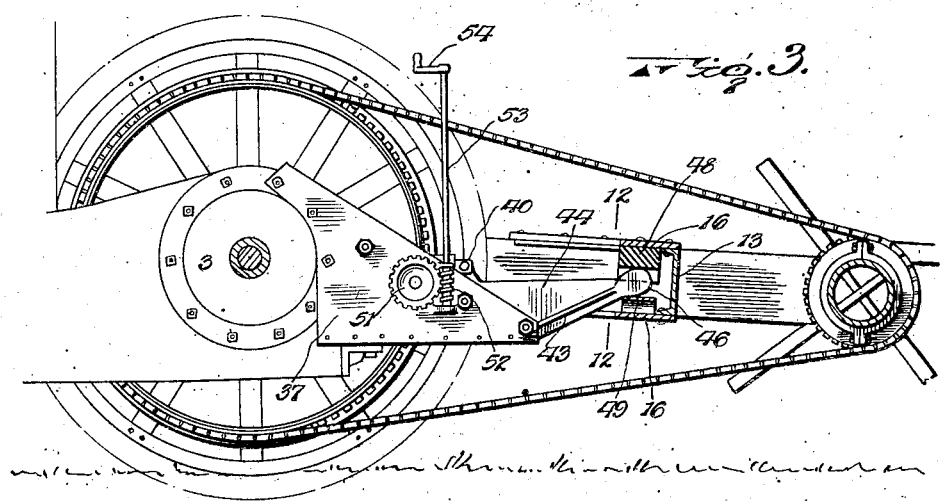
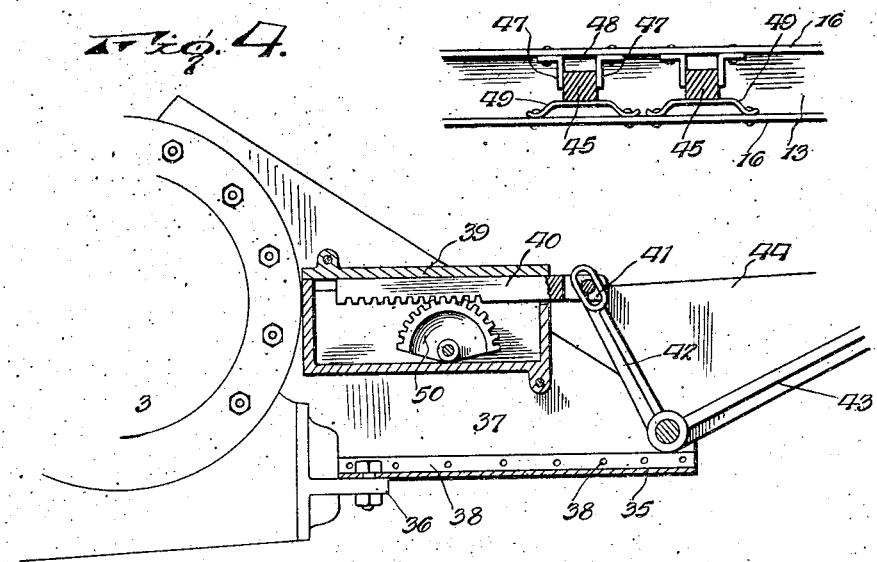
Inventor
George T. Ingersoll.
By
Lacey & Lacey, Attorneys Patented Oct. 14, 1924.

1,511,476

UNITED STATES PATENT OFFICE.

GEORGE T. INGERSOLL, OF BATTLE CREEK, MICHIGAN.

ATTACHMENT FOR TRACTORS.

Application filed July 26, 1922. Serial No. 577,621.

*To all whom it may concern:*

Be it known that I, GEORGE T. INGERSOLL, a citizen of the United States, residing at Battle Creek, in the county of Calhoun and State of Michigan, have invented certain new and useful Improvements in Attachments for Tractors, of which the following is a specification.

This invention is an attachment for tractors or motor vehicles, and has for its object the provision of a device which may be readily applied to or removed from the vehicle and operated by the power of the same whereby to treat the soil so as to prepare an efficient seed bed. The invention is illustrated in the accompanying drawings and will be hereinafter fully set forth.

In the drawings—

Figure 1 is a side elevation showing one embodiment of my invention and illustrating the position of the attachment when connected with a tractor;

Fig. 2 is a plan view of the same;

Fig. 3 is a central longitudinal section;

Fig. 4 is an enlarged longitudinal section through the means for adjusting the ground-engaging members and supporting them in a set position;

Fig. 5 is a detail longitudinal section through one end of the cylinder or drum of the ground-engaging agent;

Fig. 6 is a detail sectional elevation of one form of tooth, showing the manner of securing the tooth in the drum or cylinder;

Fig. 7 is a plan view thereof;

Figs. 8 and 9 are detail elevations of other forms of teeth;

Fig. 10 is a detail section on the line 12—12 of Fig. 3;

Fig. 11 is a horizontal section through the cap which is secured to the hub of the tractor wheel.

Referring more particularly to the drawings, the numeral 1 designates a portion of a tractor which may be of any form now upon the market and is illustrated in a more or less conventional manner. The form of tractor illustrated, in common with all the tractors now known to me, has its rear axle equipped with ground-engaging traction wheels 2 and enclosed within a housing 3 containing gearing whereby the power of the tractor engine is applied to the axle to propel the machine. In carrying out my invention, I employ a cap 4 which is preferably of the form shown in Fig. 13, but may, obviously, be varied to suit the vehicle to which it is to be applied. As shown, the cap comprises a shell 5 having the form of a frustum of a cone and provided at its base with an annular flange 6 through which securing bolts are inserted to secure the cap to the hub of the tractor wheel. In the outer end of the cap is secured a stud or pin 7, upon which is fitted a split bearing 8 to pivotally support a channel bar 9 constituting a side frame member of the attachment. A frame bar 9 is provided at each side of the device and the bars are preferably formed of channel iron having longitudinally extending notches or open-ended slots 11 at their ends to permit them to be engaged upon the pins or studs 7 between the bearings 8 and the outer ends of the caps 5, as will be readily understood and as shown in Fig. 2. The bearings 8 are designed to fit closely within the flanges of the frame bars and be secured therein by bolts 12 inserted through the flanges and the bearings, as shown in Fig. 1. At points intermediate their ends, the frame bars 9 are connected and braced by a cross bar or beam 13 which may also be of channel or angle iron and is reinforced by braces 14 disposed obliquely in advance of the said cross beam and having their ends secured to the side bars and the cross beam respectively, as will be readily understood upon reference to Fig. 2. While these braces and the cross beam may be bolted or riveted to the webs of the side bars, I have shown and prefer to use gussets or cover plates 15 which are bolted or riveted to the upper and lower flanges of the side bars and to the tops and bottoms of the braces and the cross beam, as will be readily understood. The inner ends of the braces are connected with the intermediate portion of the cross beam by cover plates 16 in a like manner, the said cover plates 16 projecting forwardly and defining a recess or chamber in which the rear end of the adjusting jack plays or is engaged, as will be hereinafter fully set forth. The side bars 9 are provided with the notches or slots 11 at their rear ends, as well as at their front ends; and bearings 17, similar in all respects to the bearings 8, are secured to the rear ends of the side bars, as shown. These bearings 17 are engaged upon studs or pins 18 which project outwardly from caps 19 which form the end closures for the drum or cylinder 20 of the ground-engaging instrumentality. The drum or cylinder 20 is conveniently a tube having its ends threaded into the caps 19 so that it will be disposed between and supported by the rear ends of the side frame bars 9. The cylinder is provided with diametrically opposite openings 21 therethrough arranged in series around the cylinder and receiving the reduced shanks 22 of teeth 23. As shown most clearly in Fig. 6, the shanks are tapered and shoulders 24 are provided at the bases of the shanks which fit closely against the outer circumference of the cylinder so that, when a binding member is applied to the free end of a shank, the corresponding tooth will be firmly secured in the cylinder. Upon referring to Figs. 6 and 7 more particularly, it will be noted that the tapered form of the shank affects a wedging engagement of the shank with the openings through the cylinder, and the width of the shank is greater than its thickness so that, when engaged through correspondingly shaped openings, relative rotation of the shank and the tooth will be positively prevented. A holding and spacing block 25 is fitted about the free end of the shank and against the surface of the cylinder, and this block is provided with a central medial groove to receive a wedge-shaped key 26 which is inserted through an opening provided therefor in the end of the shank, the block 25 being provided at its ends with lugs or projections 27 which reinforce the block and aid in preventing bending or distortion of the locking wedge-shaped key. It will be readily understood that the engagement of the key 26 in the groove of the block 25 guides the key through the opening in the shank of the tooth and supports it while it is being driven home. After it is driven home, the end of the key may, obviously, be bent or deflected so that it cannot be accidentally released. The tooth 23 may be of any form most suitable for the particular soil in which it is to work or the operation which is to be performed. In Fig. 6, I have shown a tooth which has substantially parallel front and rear sides and is tapered from its rear to its front side so as to produce an edge which will readily cut through the soil and the end of the tooth is inclined from its cutting edge toward its back and towards the cylinder. In this form of the tooth, the front and rear edges thereof are the same distance apart throughout the length of the tooth so that the tooth will merely cut through and loosen the soil. It may sometimes be desirable to not only cut through the soil but to take up portions thereof and turn the same over so that it will be more thoroughly broken up, and in such an instance the tooth shown in Fig. 9 may be employed. In this form of tooth, the front and rear edges of the tooth diverge outwardly, as indicated at 28, and the free extremity of the tooth is disposed at an angle to the length of the tooth, as shown at 29, so that the tooth will have a partial scooping action upon the soil. In Fig. 8 is shown a tooth which extends substantially in a straight line from its shank to its free end but at its free end is equipped with a pin or blade 30 which projects sharply from the forward side of the tooth so that it will dig into the ground and is especially adapted for working in heavy or hard soil. It is to be understood that, in the foregoing description, the terms "front" and "rear" are used as indicating the relative portions of the teeth in the direction of rotation of the drum or cylinder.

In the form of the invention shown in Figs. 1 and 2, the drum or cylinder 20 is rotated by chain and sprocket gearing driven directly by the rear traction wheel 2 of the tractor. In applying this driving gearing, a band 31 is secured in any convenient and effective manner to the side of the traction wheel and is equipped with a driving sprocket wheel 32, around which is trained a sprocket chain 33. A sprocket pinion 34 is secured upon the cylinder 20 and the chain 33 is trained around said sprocket so as to transmit the rotation of the gear 32 directly to said sprocket and the cylinder in an obvious manner. It will be readily noted that the rotation of the cylinder will be at a higher speed than the rotation of the driving gear and, consequently, the teeth will not merely ride upon or roll over the soil but will cut and break the same so that, as the machine progresses over the field, the surface soil will be thoroughly pulverized and finely divided and left in such a condition that seed or plants which may be sown or planted will readily propagate and rapidly grow. The driving sprocket gear 32 or the sprocket pinion 34 may be equipped with clutches so that they may be thrown out of gear when it is desired to move the machine from one field to another field or transport it over roads without effecting operation thereof. I have not illustrated such clutches, however, as they may be of any well-known construction and arrangement and their use is not essential inasmuch as I employ a jack to adjust the attachment vertically and this jack may be set to lift the machine to such a point that it will not engage the ground, in which position, of course, it may be carried from field to field.

The jack or means for adjusting the attachment vertically may be of any desired form and may be operated mechanically or by fluid pressure. To support the jack, I provide a bracket or base plate 35 which may conveniently be a short channel bar, and is so illustrated, and is shown as secured at its front end to the drawbar 36 of the tractor, although it may be mounted in any convenient way at the rear end of the tractor or other vehicle and the details of the mounting will be determined by the form of the frame of the vehicle to which the attachment is applied. To the flanges of this bracket or base plate, I secure the side supporting plates 37 by rivets, as indicated at 38, and the said side plates are of a substantially triangular formation, as shown most clearly in Fig. 3, extending up to and slightly forwardly over the housing 3 and bolted to the flanges of said housing. Rigidly secured and supported between these side plates 37 above the bracket 35 is a box or casing 39 within which is slidably supported a rack bar 40. The outer rear end of this rack bar has a pin and slot connection 41 with the upper end of the forward shorter arm 42 of a bell crank, the longer arm 43 of said bell crank extending rearwardly and being disposed within the recess or chamber defined by the cover plates 16 and the cross bar 13, as shown clearly in Fig. 3. A web 44 is formed upon the bell crank medially of the arms thereof so as to produce a rigid structure which will not bend or break under the weight imposed thereon in the operation of the machine. The rear free end of the arm 43 is preferably formed into a fork, as shown at 45 in Fig. 2, and the extremities of this fork are enlarged and given a circular form, as shown at 46 in Fig. 3, so that it may move readily upon the surfaces with which it is in contact and respond quickly to the movements of the rack bar 40. By forming the rear end of the bell crank into a fork, as shown and as stated, a more extended bearing upon the frame of the attachment is obtained and the weight of the attachment is more evenly distributed when it is lifted from the ground so that oscillation of the frame at its sides will be more effectually prevented. The ends 46 of the bell crank play between guiding brackets 47 secured to and depending from the upper cover plate 16 and above the extremities of the bell crank between said guide brackets are inserted blocks 48 of rubber so as to cushion the upward blow or movement of the bell crank. For the same purpose, leaf springs 49 are secured upon the lower cover plate 16 and bear against the under side of the ends 46 so as to cushion the downward stroke of the same. I thus very effectually overcome any jar which might otherwise be observed in the adjustment of the device and also compensate for wear in the contacting surfaces. The rack bar 40 may be reciprocated in any preferred manner. I have illustrated a pinion or segment 50 mounted for rocking movement within the box 39 and having its shaft or axle extended laterally through the side of the box and equipped with a worm pinion 51. This worm pinion 51 is engaged by the worm 52 upon the lower end of the shaft 53 which is supported in any convenient or preferred manner upon the adjacent side plate 37 and is equipped at its upper end with a handle 54 of any preferred form which may be easily manipulated from the usual seat of the tractor. It is obviously desirable to protect the teeth 23 from damage by reason of heavy objects falling thereon and also to protect the operator from injury by possible contact with said teeth and also to avoid portions of the dirt which may cling to the teeth being thrown upon the operator. To attain this end, I secure to the rear ends of the side bars 9 short extensions or arms 55 of angle iron and support upon the rear ends of these arms and upon the side bars a cover 56 which extends over the drum and the teeth. This cover may very conveniently be formed from a plate of sheet metal, as indicated at 57, bent or folded transversely into an arcuate form and secured to arcuate angle bars 58 which constitute the end supports for the guard or cover. These end bars 58 may have their forward ends bolted or riveted to the side bars 9 and their rear ends equipped with notches 59 to engage over a rod 60 secured in and extending between the rear ends of the arms 55.

My invention provides an attachment which may be applied to or removed from a tractor in a relatively short period of time and which, in use, will thoroughly break up and pulverize the soil so that it will be in proper condition for the growth of healthy plants. By the use of my attachment, subsoiling of the deepest and most effective kind may be done; humus, organic matter, and fertilizers may be worked into the soil so that it will be enriched and a perfect seed bed produced, and this process will be performed in such a manner that the enriching elements will be distributed evenly so that all parts of the field will be equally adapted to the production of valuable crops. The construction devised by me presents a strong rigid attachment which may be readily set so as to cause the teeth to penetrate to any desired depth in the ground or the attachment may be supported out of contact with the ground so as to facilitate storage or transportation of the device without uncoupling it from the tractor. The provision of the jack and the bell crank connected therewith enables the operator to set the drum so that the teeth thereon will penetrate the ground to any desired depth, and the drum will be positively held in the set position until it is again adjusted by manipulation of the jack. It will, of course, be understood that in order for the ground-treating instrumentality to operate most efficiently, considerable pressure must be exerted thereon to hold it to its work, and the jack and bell crank furnish effectual means for applying the needed pressure.

Having thus described the invention, what is claimed as new is:

1. An attachment for tractors comprising side bars constructed at their front ends to be pivotally mounted at the traction wheels of the tractor, a cross bar connecting said side bars, forwardly projecting vertically spaced members on the cross bar, a ground-treating instrumentality mounted upon the rear ends of the side bars, means for rotating said instrumentality from the tractor, a bell crank supported on the tractor, means for engaging said bell crank between the forwardly projecting members on the cross bar, and means for operating said bell crank.

2. An attachment for tractors comprising side bars constructed at their front ends to be pivotally mounted at the traction wheels of the tractor, a cross bar connecting said side bars, braces extending between the said cross bar and the side bars, cover plates secured to said cross bar and the braces, other cover plates secured to the cross bar, the braces and the side bars, the first-mentioned cover plates projecting forwardly in spaced relation, a ground-treating instrumentality mounted upon the rear ends of the side bars, means for rotating said instrumentality from the tractor, a bell crank, means for supporting said bell crank upon the tractor, means for engaging said bell crank between the forwardly projecting cover plates, and means for operating said bell crank.

3. An attachment for tractors comprising a frame to be pivotally mounted at the rear end of the tractor and including vertically spaced transverse plates in rear of the tractor, a ground-treating instrumentality mounted in the rear end of the frame, means for actuating said instrumentality from the tractor, cushions secured upon the opposed faces of the spaced plates, a bell crank mounted upon the tractor and having its rear end engaged between said cushions, and means for operating said bell crank.

4. An attachment for tractors comprising a frame to be pivotally mounted at the rear of the tractor and including vertically spaced plates, a ground-treating instrumentality carried by the rear end of said frame, means for actuating said instrumentality from the tractor, guide brackets carried by the upper of the spaced plates, a bell crank mounted upon the tractor and having its rear end playing between said guide brackets, an elastic cushion fitted between said brackets above the end of the bell crank, a spring carried by the lower spaced plate and bearing against the under side of the end of the bell crank, and means for operating said bell crank.

5. An attachment for tractors comprising a frame to be pivotally mounted at the rear end of the tractor, a ground-treating instrumentality carried by the rear end of said frame, means for operating said instrumentality from the tractor, a bracket to be secured to the drawbar of the tractor, side plates secured to said bracket and to the housing of the tractor, a box carried by and between the side plates, a bell crank fulcrumed between the rear ends of said side plates and having its rear end freely engaged in a recess in the frame, and means within said box for operating said bell crank.

6. An attachment for tractors comprising a frame pivotally mounted at the rear end of the tractor, a rotatable ground-treating instrumentality carried by the rear end of said frame and driven by power from the tractor, a bell crank fulcrumed at its angle upon the rear end of the tractor with its outer arm freely engaged in said frame, and a jack mounted at the rear end of the tractor and operatively connected to the inner arm of the bell crank whereby to raise the frame or exert pressure thereon to hold the ground-treating instrumentality to its work.

In testimony whereof I affix my signature,

GEORGE T. INGERSOLL. [L. S.]